(12) United States Patent
Martin

(10) Patent No.: US 7,586,665 B1
(45) Date of Patent: Sep. 8, 2009

(54) METAL FERROCYANIDE-POLYMER COMPOSITE LAYER WITHIN A FLEXIBLE ELECTROCHROMIC DEVICE

(75) Inventor: Paul J. Martin, Gloucester City, NJ (US)

(73) Assignee: Chameleon Optics, Inc., Philadelphia, PA (US)

( * ) Notice: Subject to any disclaimer, the term of this patent is extended or adjusted under 35 U.S.C. 154(b) by 0 days.

(21) Appl. No.: 12/256,977

(22) Filed: Oct. 23, 2008

(51) Int. Cl.
 *G02F 1/15* (2006.01)
 *G02F 1/153* (2006.01)
(52) U.S. Cl. .................... 359/265; 359/270; 359/273
(58) Field of Classification Search .......... 359/265–275
See application file for complete search history.

(56) References Cited

U.S. PATENT DOCUMENTS

| 5,470,673 | A | 11/1995 | Tseung et al. |
| 5,598,293 | A | 1/1997 | Green |
| 5,876,581 | A | 3/1999 | Itaya et al. |
| 6,456,418 | B1 | 9/2002 | Martin et al. |
| 7,414,771 | B2 | 8/2008 | Martin |
| 7,489,431 | B2 * | 2/2009 | Malmstrom et al. ......... 359/265 |

* cited by examiner

*Primary Examiner*—William C Choi
*Assistant Examiner*—Jack Dinh
(74) *Attorney, Agent, or Firm*—Duane Morris LLP

(57) ABSTRACT

A flexible electrochromic device is disclosed, the device including a flexible substrate with at least one electrically conductive surface, and an electrochromic layer comprising particles of water-insoluble metal ferrocyanide with an average particle size less than about one micron, and polymer, the electrochromic layer deposited on a conductive surface of the flexible substrate, wherein the device is capable of being deformed and returned to "flatness" in an undamaged state.

16 Claims, 3 Drawing Sheets

METAL FERROCYANIDE-POLYMER COMPOSITE LAYER WITHIN A FLEXIBLE ELECTROCHROMIC DEVICE

FIELD OF THE INVENTION

The present invention relates to the production of flexible electrochromic devices using electrically conductive flexible substrates and common manufacturing techniques.

BACKGROUND OF THE INVENTION

An electrochromic material undergoes a reversible color change upon the adsorption and desorption of small cations. This property can be exploited to fabricate a device that changes color upon the application of a voltage potential.

The typical electrochromic device comprises an electrochromic layer and an ion storage layer sandwiched between two conducting substrates, at least one of which is transparent. Optionally, the electrochromic layer and the ion storage layer can be separated by an ion-conducting electrolyte layer. Optical properties of the electrochromic device change when ions (e.g., hydrogen ions or lithium ions) intercalated within the structure of the ion-storage layer are removed and interposed within the structure of the electrochromic material in response to an electric potential applied to the conductive substrates. Ions are removed and returned to the ion-storage layer by reversing the polarity of the applied potential, thereby returning the electrochromic device to its original optical state.

The electrochromic layer and the ion storage layer are similar in that they both adsorb and desorb mobile ions in response to an applied electric field. A simple model for understanding electrochromic devices assumes that the electrochromic layer colors and clears during ion adsorption/desorption, while the ion storage layer remains transparent. However, practical electrochromic devices can be made if the ion storage layer colors as well. For example, if the electrochromic layer cycles from clear to blue on desorption (e.g. iron(III) ferrocyanide, or insoluble Prussian Blue), and the ion storage layer cycles from clear to blue upon ion adsorption (e.g. tungsten oxide), the overall device will cycle from clear to blue. If the electrochromic layer cycles from clear to blue on desorption (e.g. iron(III) ferrocyanide), and the ion storage layer cycles from clear to yellow upon ion adsorption (e.g. vanadium oxide), the overall device will cycle from clear to green. Numerous combinations are possible.

Furthermore, if the ion-conducting electrolyte layer is opaque and the electrochromic layer cycles from clear to blue, the entire device will cycle from blue to the color of the ion-conducting electrolyte layer, regardless of the coloration of the ion storage layer.

The construction of an electrochromic device typically involves coating electrochromic material onto a transparent, conductive substrate. If the electrochromic material is a metal oxide, there are several proven coating methods available. These include evaporation deposition, electro-deposition, coating a metal alkoxide from an alcoholic solution and heating in excess of 200° C., and generating the metal oxide in situ within a polymer composite. If the electrochromic material is iron (III) ferrocyanide or its analogs, deposition methods are more limited. These include electroless deposition and electro-deposition. The prior art describes general methods of casting an electrochromic polymer composite that require the incorporation of both electrochromic and conductive particles. Related technology is the dispersion of pigments in water-based paints.

An electrochromic device comprising flexible plastic substrates, such as polyethylene terephthalate coated with indium tin oxide, would have advantages over rigid electrochromic devices comprising glass substrates. These advantages include light weight, durability, shapability and low cost. Of particular interest is a flexible electrochromic device incorporating metal ferrocyanides in the electrochromic layer, as these devices demonstrate strong color contrast and good durability. However, existing methods of coating metal ferrocyanides on conductive plastic substrates require improvement. These deposition methods are not compatible with high-speed roll-to-roll processing, and in the case of electrodeposition, tend to generate considerable amounts of toxic waste solutions from spent plating baths.

Glass electrochromic devices have not achieved broad commercial acceptance in architectural, automotive or eyewear applications, due to practical limitations. First, glass electrochromic devices can be prohibitively expensive to manufacture. Second, glass electrochromic devices cannot function for the decades required for architectural and automotive applications. With each cycle, an electrochromic device suffers a minute but cumulative deterioration in performance, due to the accumulation of an irreversible colored "bronze" and trapped gas. Third, glass electrochromic devices are too heavy for eyewear applications and can also shatter to dangerous shards upon impact of a foreign object.

Plastic electrochromic devices address these limitations. Manufacturing costs are controlled by low capital requirements and high throughput. For example, as described below in accordance with the present invention, an electrochromic layer or an ion storage layer could be coated on a continuous wide web of electrically conductive polyethylene terephthalate film at a rapid rate. The layers could then be laminated together using an adhesive ion conducting electrolyte. If this laminated film is applied to architectural and automotive glazing, the film could be replaced if its performance deteriorates over time. If the laminated film is applied to polycarbonate, or if the electrochromic device is coated on the polycarbonate directly, the electrochromic device would be light and safe enough for eyewear.

SUMMARY OF THE INVENTION

The present invention provides a composition of an electrochromic layer which coats uniformly from a dispersion onto electrically conductive, flexible, plastic substrates at low processing temperatures. This composition is a polymer composite comprising water-insoluble metal ferrocyanide particles with an average particle size of less than about one micron. The most suitable metal ferrocyanides are selected from the group consisting of iron ferrocyanide, nickel ferrocyanide, cobalt ferrocyanide, zinc ferrocyanide, cadmium ferrocyanide, lead ferrocyanide, mercury ferrocyanide, silver ferrocyanide, aluminum ferrocyanide and mixtures thereof. The most suitable polymers are selected from the group consisting of polyvinyl alcohol, copolymers of vinyl alcohol, polyethylene oxide, copolymers of ethylene oxide, polyacrylates, copolymers of acrylates, polymethacrylates, copolymers of methacrylates, fluoropolymers, polyelectrolytes, polyurethanes, and mixtures thereof.

The present invention further provides a composition of an ion storage layer which coats uniformly from a dispersion onto electrically conductive, flexible, plastic substrates at low processing temperatures. This composition is a polymer composite comprising water-insoluble metal ferrocyanide particles with an average particle size of less than about one micron. The most suitable metal ferrocyanides are selected from the group consisting of iron ferrocyanide, nickel ferrocyanide, cobalt ferrocyanide, zinc ferrocyanide, cadmium ferrocyanide, lead ferrocyanide, mercury ferrocyanide, silver ferrocyanide, aluminum ferrocyanide and mixtures thereof. The most suitable polymers are selected from the group consisting of polyvinyl alcohol, copolymers of vinyl alcohol, polyethylene oxide, copolymers of ethylene oxide, polyacrylates, copolymers of acrylates, polymethacrylates, copolymers of methacrylates, fluoropolymers, polyelectrolytes, polyurethanes, and mixtures thereof.

The present invention further provides the means to fabricate electrochromic devices with the advantages of light weight, durability and flexibility.

DETAILED DESCRIPTION OF THE INVENTION

The present invention provides a composition of an electrochromic layer which coats uniformly from a dispersion onto electrically conductive, flexible substrates which require low processing temperatures. This composition is a polymer composite comprising water-insoluble metal ferrocyanide particles with an average particle size less than about one micron. The most suitable metal ferrocyanides are selected from the group of iron ferrocyanide, nickel ferrocyanide, cobalt ferrocyanide, zinc ferrocyanide, cadmium ferrocyanide, lead ferrocyanide, mercury ferrocyanide, silver ferrocyanide, aluminum ferrocyanide and mixtures thereof. The most suitable polymers are selected from the group of polyvinyl alcohol, copolymers of vinyl alcohol, polyethylene oxide, copolymers of ethylene oxide, polyacrylates, copolymers of acrylates, polymethacrylates, copolymers of methacrylates, fluoropolymers, polyelectrolytes, polyurethanes, and mixtures thereof.

The flexible substrate may be an electrically conductive metal or metal alloy, selected from the group consisting of stainless steel, steel, nickel, aluminum, iron, copper, gold, silver, platinum, palladium, indium, tin, and chromium.

In embodiments, the flexible substrate is plastic, with the plastic deposited on at least one side with an electrically conductive layer. Alternatively, the flexible substrate is polyethylene terephthalate, wherein the polyethylene terephthalate is deposited on one side with an electrically conductive layer, e.g., indium tin oxide. The flexible substrate may also be (a) polycarbonate, wherein the polycarbonate is deposited on one side with an electrically conductive layer, or (b) fabric. Also, at least one electrically conductive layer in the present invention may be patterned.

Figure 1:
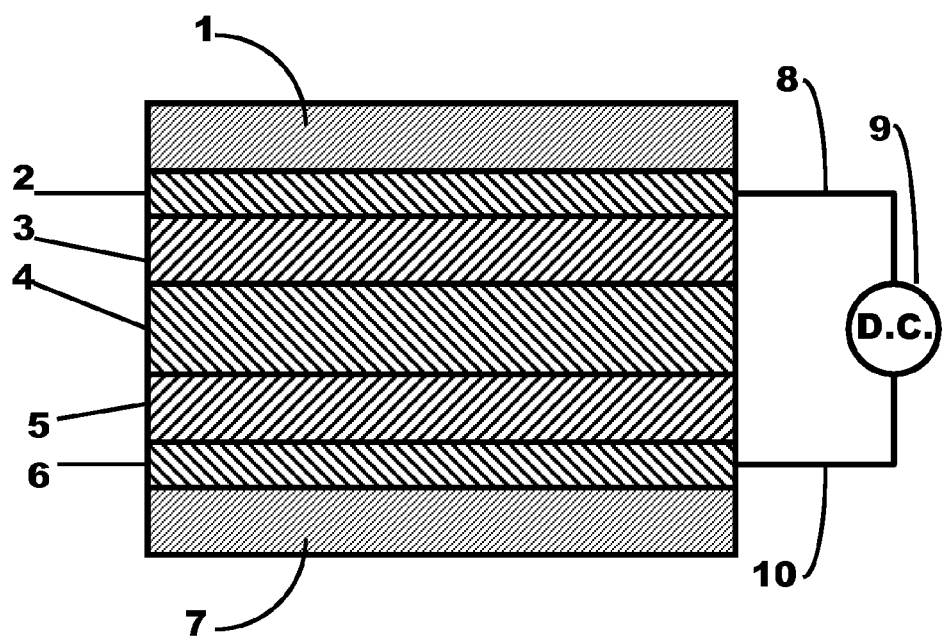
FIG. 1 is a cross-sectional view of the various layers of an embodiment of the present invention, the layers being deposited on polyethylene terephthalate film.

Referring now to FIG. 1, there is shown a flexible electrochromic device according to the present invention that includes transparent polyethylene terephthalate substrate 1 and transparent polyethylene terephthalate substrate 7. Onto polyethylene terephthalate substrate 1 is deposited conducting layer 2 of indium tin oxide; onto transparent polyethylene terephthalate substrate 7 is deposited conducting layer 6 of indium tin oxide. Polyethylene terephthalate coated with indium tin oxide is commercially available.

Electrochromic layer 3, a polymer composite comprising water-insoluble metal ferrocyanide particles with an average particle size less than about one micron, is formed on layer 2 from a dispersion using a coating process to be described below. It should be understood that this coating process is not critical in the present invention, and that the electrochromic layer can be formed as desired.

Ion storage layer 5, a polymer composite comprising a metal oxide and a perfluorosulfonated anionic polyelectrolyte is formed on layer 6 from a dispersion using a coating process to be described below. It should be understood that this coating process is not critical in the present invention, and that the ion storage layer can be formed as desired.

Ion conducting layer 4 comprising a polymer binder, a plasticizer, and a source of mobile cations is formed on layer 5 using a coating method to be described below, and laminated to layer 3. It should be understood that this coating process is also not critical in the present invention and that the ion conducting layer can be formed as desired.

It should be further understood that the composition and method of application of layer 4 and layer 5 is not critical in the present invention and that alternate art can be used as desired.

From a direct current power supply 9, electrical connection 8 is made to indium tin oxide layer 2, and electrical connection 10 is made to indium tin oxide layer 6.

Figure 2:
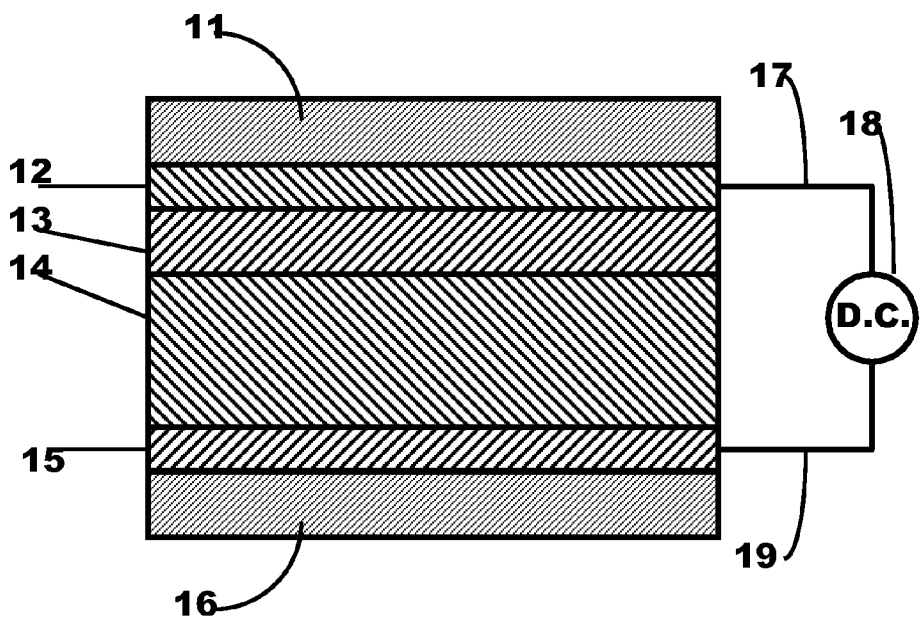
FIG. 2 is a cross-sectional view of the various layers of an embodiment of the present invention, the ion-storage layer being eliminated and the layers being deposited on polyethylene terephthalate film.

Referring now to FIG. 2, there is shown a flexible electrochromic device according to the present invention that includes transparent polyethylene terephthalate substrate 11 and transparent polyethylene terephthalate substrate 16. Onto polyethylene terephthalate substrate 11 is deposited conducting layer 12 of indium tin oxide; onto transparent polyethylene terephthalate substrate 16 is deposited conducting layer 15 of indium tin oxide. Polyethylene terephthalate coated with indium tin oxide is commercially available.

Electrochromic layer 13, a polymer composite comprising water-insoluble metal ferrocyanide particles with an average particle size less than about one micron, is formed on layer 12 from a dispersion using a coating process to be described below. It should be understood that this composition and coating process is not critical in the present invention, and that the electrochromic layer can be formed as desired.

Ion conducting layer 14 comprising a polymer binder, a plasticizer, and a source of mobile cations, is formed on layer 15 using a coating process to be described below, and laminated to layer 13. It should be understood that this coating process is not critical in the present invention and that the ion-conducting layer can be formed as desired.

From a direct current power supply 18, electrical connection 17 is made to indium tin oxide layer 12, and electrical connection 19 is made to indium tin oxide layer 15.

Figure 3:
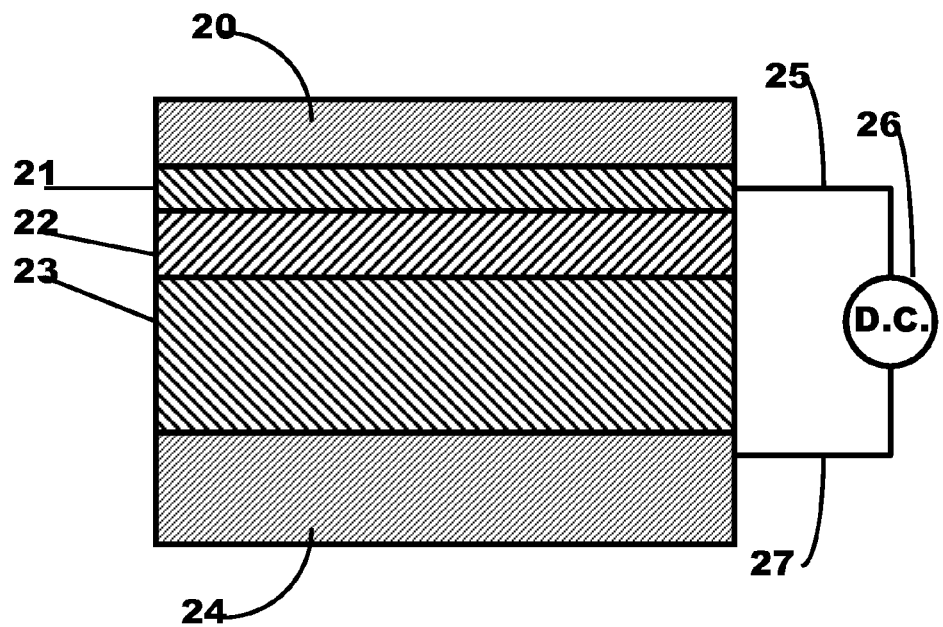
FIG. 3 is a cross-sectional view of the various layers of an embodiment of the present invention, the ion-storage layer being eliminated and the layers being deposited on stainless steel foil.

Referring now to FIG. 3, there is shown a flexible electrochromic device according to the present invention that includes transparent polyethylene terephthalate substrate 20 and flexible stainless steel substrate 24. Onto polyethylene terephthalate substrate 20 is deposited conducting layer 21 of indium tin oxide. Polyethylene terephthalate coated with indium tin oxide is commercially available.

Electrochromic layer 22, a polymer composite comprising water-insoluble metal ferrocyanide particles with an average particle size less than about one micron, is formed on layer 21 from a dispersion using a coating process to be described below. It should be understood that this composition and coating process is not critical in the present invention, and that the electrochromic layer can be formed as desired.

Ion conducting layer 23 comprising a polymer binder, a plasticizer, and a source of mobile cations, is formed on layer 24 using a coating process to be described below, and laminated to layer 22. It should be understood that this coating process is not critical in the present invention and that the ion-conducting layer can be formed as desired.

From a direct current power supply 26, electrical connection 25 is made to indium tin oxide layer 21, and electrical connection 27 is made to the stainless steel substrate 24.

The particle size of the metal ferrocyanide in the electrochromic polymer composite has a dramatic impact on the optical properties of the electrochromic device, with average particle sizes of much less than about one micron being strongly preferred for transparency and color contrast. In Example 1, the limited electrochromic performance of commercial iron (III) ferrocyanide, with an average particle size greater than about one micron, is demonstrated. However, in the rest of the examples, iron (III) ferrocyanide with average particle size less than about one micron is synthesized in aqueous dispersion by the following reaction:

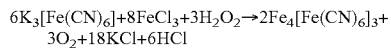

$6K_3[Fe(CN)_6]+8FeCl_3+3H_2O_2 \rightarrow 2Fe_4[Fe(CN)_6]_3+3O_2+18KCl+6HCl$

While the iron(III) ferrocyanide is water-insoluble, the unwanted by-products are water-soluble and can be washed away.

There are several methods of producing dispersions of sub-micron iron(III) ferrocyanide particles from the above reaction. For example, dilute aqueous hydrogen peroxide can be added dropwise with rapid stirring to a dilute aqueous solution of potassium ferricyanide(III) and iron(III) chloride. Alternatively, a dilute aqueous solution of iron(III) chloride and hydrogen peroxide can be added dropwise with rapid stirring to a dilute aqueous solution of potassium ferricyanide (III) and hydrogen peroxide. The ferricyanide solution may also be added dropwise to the chloride solution. However, most effective is the use of a dispersing polymer. A dilute aqueous solution of iron(III) chloride, hydrogen peroxide, and a dispersing polymer such as polyethylene oxide or polyvinyl alcohol, can be added dropwise with rapid stirring to a dilute aqueous solution of potassium ferricyanide(III), hydrogen peroxide and a dispersing polymer such as polyethylene oxide or polyvinyl alcohol. The ferricyanide solution may also be added dropwise to the chloride solution. Methods utilizing dispersing polymer can produce iron(III) ferrocyanide particles with average particle sizes less than a nanometer.

Once a dilute dispersion is produced, it is necessary to concentrate it to make it useful. Concentration methods include settling, centrifugation, and filtration followed by removal of the supernate. These methods remove with the supernate unwanted water-soluble byproducts, which can interfere with the electrochromic behavior of the iron(III) ferrocyanide. A less desirable concentration method is evaporation, which leaves the unwanted water-soluble by-products behind.

It may be necessary to modify the composition of the liquid medium of the iron(III) ferrocyanide dispersion to improve coating performance or compatibility with a polymer binder. For example, it may be desirable to add alcohol. In this case, the alcohol is mixed into the concentrated dispersion. Then, the dispersion must once again be re-concentrated.

Once the concentrated dispersion is ready, a polymer binder can be mixed in to complete the casting dispersion. Once this dispersion is cast and dried, an electrochromic composite layer is formed that is flexible and adheres to the underlying substrate.

In the following examples, the ion storage layer is prepared by the method of Martin, U.S. Pat. No. 6,456,418, incorporated by reference herein. The ion-conducting layer coating solution is prepared by the method of Martin, U.S. Pat. No. 7,414,771, also incorporated by reference herein.

EXAMPLE 1

Example 1 demonstrates the synthesis of electrochromic polymer composites containing metal ferrocyanide particles with average particle sizes greater than about one micron. Such composites show poor transparency and poor color contrast on cycling.

The electrochromic layer was prepared in the following manner: A 4 wt % aqueous polyvinyl alcohol solution was prepared by mixing 1 g of polyvinyl alcohol (Scientific Polymer Products, 99% hydrolyzed, AVG MW ca 86,000) into 24 g of distilled water with heating and stirring. Into an 8 mL vial was measured 2 g of the 4 wt % aqueous polyvinyl alcohol solution and 0.08 g of iron(III) ferrocyanide, $Fe_4[Fe(CN)_6]_3$ (insoluble Prussian Blue, Aldrich Chemical company, average particle size >1 micron). The vial was rotated at 4 RPM for 10 minutes to disperse the solids. The vial was then sonicated at room temperature for 1 hour in an ultrasonic bath. During sonication, the dispersion changed in color from black to deep blue.

Using the dispersion described immediately above, the electrochromic layer was coated onto a 75 mm×100 mm×0.2 mm indium tin oxide/polyethylene terephthalate (ITO/PET) substrate using an automatic sheet coater. The automatic sheet coater was outfitted with a size 20 (twenty) rod, which provides a 50 micron wet thickness. The ITO/PET was clipped in place along the 100 mm side with the conductive side up. The coating bar was lowered into place after assuring that it was fully returned to the start position. About 0.5 mL of coating dispersion was then slowly squirted at the interface of the bar and the ITO/PET film with a disposable pipette. The automatic sheet coater was turned on and the coating bar advanced the bar along the coating surface. The bar was stopped about 75 mm beyond the end of the ITO/PET, i.e. the bar was allowed to travel about 75 mm on the glass coating surface. The bar was then lifted. The film was removed from the automatic sheet coater and was allowed to let stand horizontally for about 5 minutes. It was placed in an 115° C. oven for 20 minutes. The coated layer was well-adhered but was nearly opaque due to numerous visible particles. The dimensions of the coated layer were approximately 62.5 mm×100 mm×3µ thick. The leading edge of the ITO/PET substrate was left uncoated to allow for electrical connection.

The ion-storage-layer was prepared in the following manner: A 250 mL Erlenmeyer flask was equipped with a stirring bar and set in a room-temperature water bath on a magnetic stirrer. The apparatus was held in place by a ring stand and clamps. All subsequent operation took place behind a transparent safety shield to protect against eruptions. Into the Erlenmeyer flask was introduced about 40 g of reagent grade 30 wt. % aqueous hydrogen peroxide. The hydrogen peroxide was stirred and permitted to come to equilibrium with the water bath. Over the next 20 minutes, elemental tungsten powder of approximately 10µ particle size was added to the hydrogen peroxide. A vigorous reaction ensued, and within about 120 minutes the tungsten was digested. The flask was removed from the bath, and platinum gauze inserted in the solution to remove excess peroxide. The flask was covered and allowed to stand overnight with the gauze in place. The following day, the gauze was removed, and to the beaker was added about 150 g of neat ethanol. After mixing, the solution was filtered through fluted filter paper into a glass bottle. Upon standing for one week, the solution changed from a translucent, slightly yellow solution to a deeper "straw" yellow. This solution was about 5 wt. % tungstic acid in essentially ethanol. To complete the formulation, a 5 wt. % solution of perfluorosulfonated anionic polyelectrolyte in alcohol, obtained from Aldrich Chemical of Milwaukee Wis. and described as a 5% solution of Nafion® resin, was used as received. About 0.25 g of the perfluorosulfonated anionic polyelectrolyte solution was mixed with about 4.75 g grams of the tungstic acid solution to create the ion-storage-layer coating solution.

The ion-storage layer was coated onto a 75 mm×100 mm×0.2 mm ITO/PET substrate using an automatic sheet coater. The automatic sheet coater was outfitted with a size 40 (forty) rod, which provides a 100 micron wet thickness. The ITO/PET was clipped in place along the 100 mm side with the conductive side up. The coating bar was lowered into place after assuring that it was fully returned to the start position. About 0.5 mL of coating dispersion was then slowly squirted at the interface of the bar and the ITO/PET film with a disposable pipette. The automatic sheet coater was turned on and the coating bar advanced the bar along the coating surface. The bar was stopped about 75 mm beyond the end of the ITO/PET, i.e. the bar was allowed to travel about 75 mm on the glass coating surface. The bar was then lifted. The film was removed from the automatic sheet coater and was allowed to let stand horizontally for about 5 minutes. It was placed in an 115° C. oven for 20 minutes. The coated layer was transparent, and of approximate dimension 62.5 mm×100 mm×6μ thick. The leading edge of the ITO/PET substrate was left uncoated to allow for electrical connection.

The ion-conducting-layer was prepared in the following manner: Into 15 g of ethanol (anhydrous, as received from Aldrich Chemical) was dissolved 5 g of poly 1-vinylpyrrolidone-co-vinyl acetate (50K MW; mole ratio VP:VA 1.3:1, as received from Aldrich), 7.5 g of poly(ethylene glycol) dimethyl ether MW 250 (as received from Aldrich Chemical), and 2.0 g of $LiClO_4$. It was stirred to dissolve to a clear solution.

The ion-conducting layer was coated directly on the ion-storage layer. The ion-storage-coated film was clipped onto the automatic sheet coater surface on the uncovered conductive border. The automatic sheet coater was outfitted with a size 40 (forty) rod, which provides a 100 micron wet thickness. The ion-storage-coated film was clipped in place along the 100 mm side with the conductive side up. The coating bar was lowered into place after assuring that it was fully returned to the start position. About 0.5 mL of coating dispersion was then slowly squirted at the interface of the bar and the ITO/PET film with a disposable pipette. The automatic sheet coater was turned on and the coating bar advanced the bar along the coating surface. The bar was stopped about 75 mm beyond the end of the ITO/PET, i.e. the bar was allowed to travel about 75 mm on the glass coating surface. The bar was then lifted. The film was removed from the automatic sheet coater and was allowed to let stand horizontally for about 5 minutes. It was placed in an 115° C. oven for 20 minutes. The coated layer was transparent, and of approximate dimension 62.5 mm×100 mm×25μ thick. The leading edge of the ITO/PET substrate was left uncoated to allow for electrical connection.

The device was assembled in a 40° C. roll laminator. The coated electrochromic layer was laminated to the coated ion-storage/ion-conducting layer to create the structure described in FIG. 1. The substrates were offset slightly to create a device of final dimension 100 mm×100 mm. The uncoated ITO on each substrate was striped with silver conductive paint in order to improve electrical contact for subsequent testing. The laminated device was heterogeneous in appearance, with numerous entrained particles.

Electrical connection was made to each electrode through a double-pole, double-throw (DPDT) switch controlled by a computer, so that a 3.0 volt potential could be applied to the electrodes, and the polarity reversed every 2 minutes. Applying a voltage potential, then reversing the polarity with the DPDT switch, allowed visible detection of a reversible electrochromic effect. For example, upon making an electrochromic electrode the cathode, the electrochromic electrode would lighten. Upon reversing the polarity and making an electrochromic electrode the anode, the electrochromic electrode would darken.

While the color change was perceptible, the component did not cycle with good contrast. Furthermore, transparency was limited due to the poor dispersion of the commercial iron (III) ferrocyanide particles.

EXAMPLE 2

Example 2 demonstrates the usefulness of sub-micron iron (III) ferrocyanide particles, and the utility of perfluorosulfonated anionic polyelectrolyte in the electrochromic polymer composite.

The electrochromic layer coating solution was prepared in the following manner: Into a tall 180 mL beaker equipped with a stirring bar was measured 14.5 g of distilled water, 0.12 g of iron(III) chloride hexahydrate (Aldrich, reagent grade) and 0.10 g of potassium ferricyanide(III) (Aldrich, reagent grade). With vigorous stirring, to this solution was added dropwise 4.0 g of aqueous 7.5 wt % $H_2O_2$. The solution immediately turned blue, indicating the formation of an iron (III) ferrocyanide dispersion. The dispersion stirred for 15 minutes to complete the reaction. To this was added 125 g of distilled water, which virtually filled the beaker, to wash the iron (III) ferrocyanide. The beaker was then allowed to stand for 20 days to allow the iron (III) ferrocyanide to settle and concentrate. This resulted in a separation with a clear supernate. The clear supernate was discarded, leaving about 11 g of dark blue 1% iron (III) ferrocyanide aqueous dispersion. By means of this washing/settling procedure, the dispersion had in excess of 90% of its soluble impurities (KCl, HCl) removed with the supernate.

A thick paste was prepared by taking 6 g of the above dispersion, adding 0.05 g of 10 wt. % solution of perfluorosulfonated anionic polyelectrolyte in water (Aldrich Nafion® resin), mixing through sonication, and evaporating 66% of the water in a 100° C. oven.

About 0.5 g of this paste was combined with 0.05 g of 10 wt % aqueous Nafion and 0.2 g of isopropyl alcohol to complete the coating dispersion. Using the dispersion described immediately above, the electrochromic layer was coated onto a 75 mm×100 mm×0.2 mm ITO/PET substrate using the method described in Example 1.

For this example, an ion storage layer was prepared by the method described in Example 1.

The ion-conducting layer coating solution was prepared in the following manner. Into 40 g of ethanol (anhydrous, as received from Aldrich Chemical) was dissolved 5 g of poly 1-vinylpyrrolidone-co-vinyl Acetate (50K MW; mole ratio VP :VA 1.3:1, as received from Aldrich), 10 g of poly 1-vinylpyrrolidone-co-vinyl Acetate (50 wt % in Isopropyl Alcohol, 13K MW; mole ratio VP:VA 1:2.4, as received from Aldrich), 5 g of tetraethylene glycol (as received from Aldrich Chemical), and 3.6 g of $LiClO_4$. It was stirred to dissolve to a clear solution.

The ion-conducting layer was coated directly on the ion-storage layer by the method described in Example 1.

The device was assembled by the method described in Example 1. The laminate was a low-haze blue, uniform and bubble-free, with no entrained particulates.

Electrical connection was made to each electrode through a double-pole, double-throw (DPDT) switch controlled by a computer, so that a 1.5 volt potential could be applied to the electrodes, and the polarity reversed every 2 minutes. Using half the voltage of Example 1, this laminate cycled from light blue to dark blue with good contrast over 12,000 times.

EXAMPLE 3

Example 3 demonstrates the utility of polyethylene oxide in the electrochromic polymer composite, and a more convenient method of making a composite with sub-micron iron (III) ferrocyanide particles. It also demonstrates the replacement of water in the dispersion with alcohol.

The electrochromic layer coating solution was prepared in the following manner: Into a tall 180 mL beaker equipped with a stirring bar was measured 70 g of distilled water and 0.05 g of polyethylene oxide (Aldrich, AVG MW 300,000). The solution was stirred for about 15 minutes to dissolve the polymer. To this was then added 0.10 g of potassium ferricyanide (III), and about 0.3 mL of aqueous 1% hydrogen peroxide solution.

Into a 100 mL beaker was measured 70 g of distilled water and 0.05 g of polyethylene oxide. The solution was stirred for about 15 minutes to dissolve the polymer. To this was then added 0.12 g of iron (III) chloride hexahydrate, and about 0.3 mL of aqueous 1% hydrogen peroxide solution.

With vigorous stirring, the iron (III) chloride solution was slowly added dropwise to the potassium ferricyanide (III) solution. The solution turned blue and generated oxygen bubbles. The solution was allowed to stir for 30 minutes to complete the reaction. This resulted in a dispersion containing iron (III) ferrocyanide particles less than about 1 nm in average size. The dispersion was covered and allowed to settle.

After 8 days, sufficient clear supernate was discarded to leave 12.6 g of dispersion. To this was added enough ethanol to make the dispersion liquid medium 80% ethanol and 20% water. The dispersion was again allowed to settle.

After an additional 3 days, the clear supernate was again removed from the dispersion, leaving approximately 6.5 g of dispersion. This was approximately a 1.4% dispersion of iron (III) ferrocyanide in 80% ethanol and 20% water. To this was added 0.032 g of higher molecular weight polyethylene oxide (Aldrich, AVG MW 2,000,000). The dispersion was shaken to dissolve the polymer. This was the coating dispersion for the electrochromic layer.

Using this coating dispersion, the electrochromic layer was coated onto a 75 mm×100 mm×0.2 mm ITO/PET substrate using the method described in Example 1.

The ion storage layer was prepared by the method described in Example 1.

The ion-conducting layer was prepared by the method described in Example 1.

The device was assembled by the method described in Example 1. The laminate was a low-haze blue, uniform and bubble-free, with no entrained particulates.

Electrical connection was made to each electrode through a double-pole, double-throw (DPDT) switch controlled by computer, so that a 1.5 volt potential could be applied to the electrodes, and the polarity reversed every 2 minutes.

Using half the voltage of Example 1, this laminate cycled from light blue to dark blue with good contrast over 20,000 times.

EXAMPLE 4

Example 4 demonstrates the utility of polyvinyl alcohol in the electrochromic polymer composite.

The electrochromic layer was prepared in the following manner: Into a tall 180 mL beaker equipped with a stirring bar was measured 85 g of distilled water, 0.230 g of iron (III) chloride hexahydrate and about 0.6 mL of the 1% hydrogen peroxide solution. Into a 100 mL beaker was measured 60 g of distilled water, 0.2 g of potassium ferricyanide (III) and about 0.6 mL of the 1% hydrogen peroxide solution. With vigorous stirring, the potassium ferricyanide (III) solution was slowly added dropwise to the iron (III) chloride solution. The solution turned blue and generated oxygen bubbles. The solution was allowed to stir for 30 minutes to complete the reaction. This resulted in an aqueous dispersion with iron (III) ferrocyanide particles about 2 nm in average size. The dispersion was covered and allowed to settle.

After 14 days, sufficient clear supernate was discarded to leave 7.4 g of dispersion. This is approximately a 2.3% dispersion of iron (III) ferrocyanide in water. To this was added 0.065 g of polyvinyl alcohol (Scientific Polymer Products, 99% hydrolyzed, AVG MW ca 86,000). The dispersion was heated to about 90° C. and stirred for one hour to dissolve the polymer. Thereafter, dispersion was sonicated for one hour at 40° C. to complete the mixing.

Using the dispersion described immediately above, the electrochromic layer was coated onto a 75 mm×100 mm×0.2 mm ITO/PET substrate using the method described in Example 1.

The ion storage layer was prepared by the method described in Example 1.

The ion-conducting layer was prepared by the method described in Example 1.

The device was assembled by the method described in Example 1. The laminate was a low-haze blue, uniform and bubble-free, with no entrained particulates.

Electrical connection was made to each electrode through a double-pole, double-throw (DPDT) switch controlled by computer, so that a 1.5 volt potential could be applied to the electrodes, and the polarity reversed every 2 minutes. Using half the voltage of Example 1, this laminate cycled from light blue to dark blue with good contrast over 5,000 times.

EXAMPLE 5

Example 5 demonstrates the utility of the structure described in FIG. 2.

For this example, the electrochromic layer was prepared by the method described in Example 4.

For this example, no ion storage layer was prepared.

The ion-conducting layer coating was prepared by the method described in Example 4. It was coated directly onto a 75 mm×100 mm×0.2 mm ITO/PET substrate using the method described in Example 4.

The device was assembled by the method described in Example 1. The laminate was a low-haze blue, uniform and bubble-free, with no entrained particulates.

Electrical connection was made to each electrode through a double-pole, double-throw (DPDT) switch controlled by computer, so that a 1.5 volt potential could be applied to the electrodes, and the polarity reversed every 2 minutes. This laminate cycled from light blue to dark blue with good contrast five times.

EXAMPLE 6

Example 5 demonstrates the utility of the structure described in FIG. 3.

For this example, the electrochromic layer was prepared by the method described in Example 4.

For this example, no ion storage layer was prepared.

The ion-conducting layer coating was prepared by the method described in Example 4. It was coated directly onto a 75 mm×75 mm×0.2 mm stainless steel substrate using the method described in Example 4.

The device was assembled by the method described in Example 1. The laminate was a low-haze blue, uniform and bubble-free, with no entrained particulates.

Electrical connection was made to each electrode through a double-pole, double-throw (DPDT) switch controlled by computer, so that a 1.5 volt potential could be applied to the electrodes, and the polarity reversed every 2 minutes. This laminate cycled from light blue to dark blue with good contrast five times.

What is claimed is:

1. A flexible electrochromic device comprising:
   (a) a flexible substrate with at least one electrically conductive surface; and
   (b) an electrochromic layer comprising particles of (i) a water-insoluble metal ferrocyanide with an average particle size less than about one micron, and
   (ii) a polymer, said electrochromic layer deposited on a conductive surface of the flexible substrate,
   wherein said device is capable of being deformed and returned to flatness in an undamaged state.

2. The flexible electrochromic device as recited in claim 1, wherein said water-insoluble metal ferrocyanide is selected from the group consisting of iron ferrocyanide, nickel ferrocyanide, cobalt ferrocyanide, zinc ferrocyanide, cadmium ferrocyanide, lead ferrocyanide, mercury ferrocyanide, silver ferrocyanide, aluminum ferrocyanide and mixtures thereof.

3. The flexible electrochromic device as recited in claim 2, wherein said water-insoluble metal ferrocyanide is iron (III) ferrocyanide.

4. The flexible electrochromic device as recited in claim 1, wherein said polymer is selected from the group consisting of polyvinyl alcohol, copolymers of vinyl alcohol, polyethylene oxide, copolymers of ethylene oxide, polyacrylates, copolymers of acrylates, polymethacrylates, copolymers of methacrylates, fluoropolymers, polyelectrolytes, polyurethanes, and mixtures thereof.

5. The flexible electrochromic device as recited in claim 1, wherein said polymer is selected from the group consisting of polyvinyl alcohol and copolymers of polyvinyl alcohol.

6. The flexible electrochromic device as recited in claim 1, wherein said flexible substrate is an electrically conductive metal or metal alloy.

7. The flexible electrochromic device as recited in claim 6, wherein the electrically conductive metal or metal alloy is selected from the group consisting of stainless steel, steel, nickel, aluminum, iron, copper, gold, silver, platinum, palladium, indium, tin, and chromium.

8. The flexible electrochromic device as recited in claim 1, wherein said flexible substrate is plastic.

9. The flexible substrate as recited in claim 8, wherein the plastic is deposited on at least one side with an electrically conductive layer.

10. The flexible electrochromic device as recited in claim 1, wherein the flexible substrate is polyethylene terephthalate.

11. The flexible electrochromic device as recited in claim 10, wherein the polyethylene terephthalate is deposited on one side with an electrically conductive layer.

12. The flexible electrochromic device as recited in claim 10, wherein the polyethylene terephthalate is deposited on one side with indium tin oxide.

13. The flexible electrochromic device as recited in claim 1, wherein the flexible substrate is polycarbonate.

14. The flexible electrochromic device as recited in claim 13, wherein the polycarbonate is deposited on one side with an electrically conductive layer.

15. The flexible electrochromic device as recited in claim 1, wherein the flexible substrate is fabric.

16. The flexible electrochromic device as recited in claim 9, wherein at least one electrically conductive layer is patterned.

* * * * *